H. S. MURRAY.
Milk-Cooler.
No. 162,574. Patented April 27, 1875.
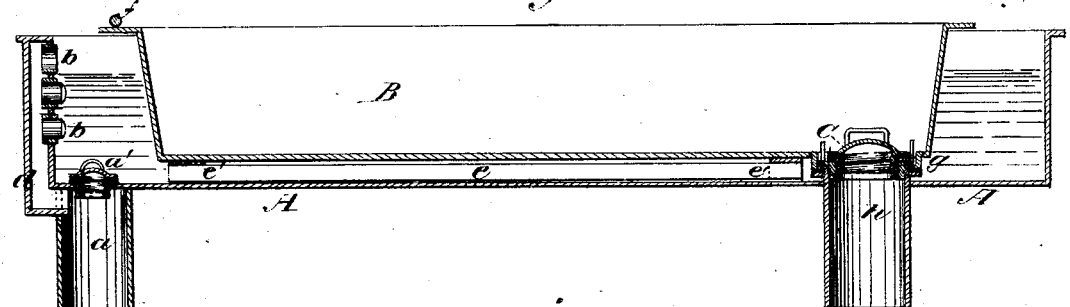
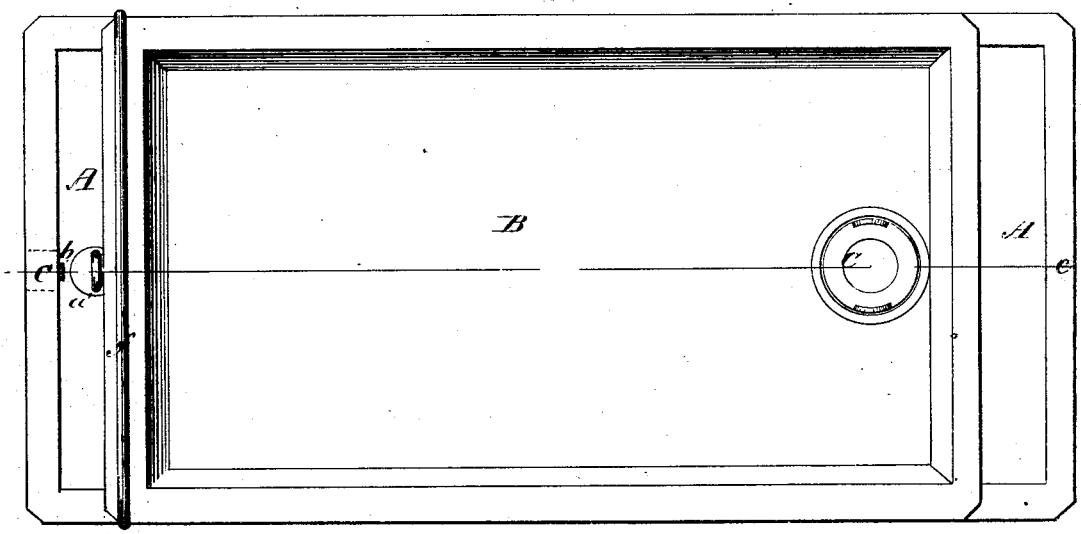
WITNESSES:
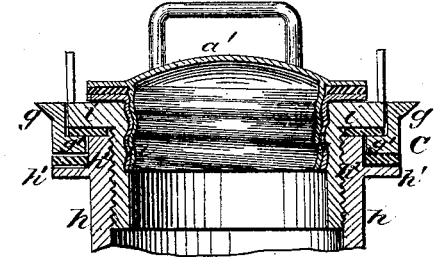
INVENTOR:
H. S. Murray
BY
ATTORNEYS.

UNITED STATES PATENT OFFICE.

HENRY S. MURRAY, OF ANDES, NEW YORK.

IMPROVEMENT IN MILK-COOLERS.

Specification forming part of Letters Patent No. 162,574, dated April 27, 1875; application filed January 30, 1875.

*To all whom it may concern:*

Be it known that I, HENRY S. MURRAY, of Andes, in the county of Delaware and State of New York, have invented a new and Improved Milk-Cooler, of which the following is a specification:

In the accompanying drawing, Figure 1 represents a vertical longitudinal section, on the line $c\,c$, Fig. 2, of my improved milk-cooler; Fig. 2, a top view of the same; and Figs. 3 and 4, detail cross-sections of the outlet tubes of the water and milk pans.

Similar letters of reference indicate corresponding parts.

The invention will first be fully described, and then pointed out in the claim.

In the drawing, A represents a water tank or vat, of suitable size, which is preferably made of sheet metal, tinned or painted, and supported on a table, or other suitable base support. The tank A has rectangular side walls and top flanges, wired and soldered in the usual manner. The milk-pan B is made of similar material, with wired top flanges and inclined sides, for being placed into the water-tank, and leaving a side and bottom space for the passage of the water around the pan. The water enters into the tank by a pipe from the spring or well, and leaves the same through an exit-tube, $a$, at the bottom of the same, the height of water being regulated by a number of holes or tubes, $b$, arranged vertically above each other in the sides of the tank. One of these tubes $b$ is open, while the others are kept closed by suitable screw caps or plugs. An outer overflow-tube, $d$, connects the tubes $b$ with the exit-tube $a$, and conveys the water from the tank to the exit tube, which is kept tightly closed, by a screw cap, $a'$, until it is desired to let the water run out entirely, for cleaning or repairing the tank, in which case the screw-cap is taken off.

The bottom of the milk-pan B rests on a wooden bar, $e$, which runs endwise, in longitudinal direction, through a portion of the tank, being secured by staples or bands $e'$.

The position of the pan in the tank is firmly secured by a lateral wire guard, $f$, which binds over the end flange of the pan, and by an outlet tube or faucet, C, near the other end of the pan. The outlet tube C consists of an annular socket, $g$, with shoulder $g'$, which is soldered around a bottom perforation of the milk-pan, and seated on a circumferential collar, $h^1$, of an exit-tube, $h$, of the tank. A top flange, $h^2$, of the exit-tube $h$, extends into the socket $g$, forming, in connection with the shoulder $g'$ of the socket, the seat for the circumferential flange of a short tube, $i$, which screws into the threaded part of the exit-tube $h$, so as to bind the socket, exit-tube, and connecting-tube firmly together. Intermediate packing-rings produce the water and milk tight connection of the pan and tank, so that the milk may be drawn off without leaking, or mixing with water from the tank. A screw cap or plug is screwed into the binding-tube $i$ of the faucet, for closing the same, in the same manner as in the water-exit tube, and retained until it is necessary to draw off the milk, in which case the screw cap or plug is withdrawn.

For cleaning the pan the binding-tube is unscrewed, which serves the twofold purpose of securing the pan in position in the tank and connecting it tightly with the outlet-faucet. As the faucet is screwed and unscrewed from the inside of the pan, it is more convenient and easier attended to for cleaning the pans, &c., than when the faucet is secured from the outside of the vat, as it avoids entirely the coming in contact with the milk-conveying funnel or tubing.

Having thus described my invention, I claim as new and desire to secure by Letters Patent—

In milk-coolers the outlet-tube C, consisting of annular socket $g\,g'$, flanged collar $h\,h^1\,h^2$, threaded and flanged tube $i$, and the screw-cap extending up inside of pan, in combination with a bottom-perforated water-tank and milk-pan, A B, as shown and described, whereby the screw-cap and binding-tube may be more readily removed.

HENRY S. MURRAY.

Witnesses:
 JAS. F. SCOTT,
 JAMES GLADSTON.